Feb. 5, 1929.

H. T. HERR 1,701,364

DIESEL GENERATOR COMBINATION

Filed March 1, 1927   5 Sheets-Sheet 1

WITNESSES:
E. Lutz

H.T.Herr
INVENTOR

BY
A.B. Reavis
ATTORNEY

Feb. 5, 1929.

H. T. HERR 1,701,364

DIESEL GENERATOR COMBINATION

Filed March 1, 1927

WITNESSES:
E. Lutz

H. T. Herr
INVENTOR

BY
A. B. Reavis
ATTORNEY

Feb. 5, 1929.

H. T. HERR 1,701,364

DIESEL GENERATOR COMBINATION

Filed March 1, 1927      5 Sheets-Sheet 3

WITNESSES:
E. Lutz

H.T.Herr
INVENTOR

BY A. B. Reavis
ATTORNEY

Feb. 5, 1929.

H. T. HERR 1,701,364

DIESEL GENERATOR COMBINATION

Filed March 1, 1927    5 Sheets-Sheet 4

WITNESSES:
E. Lutz

H.T.Herr
INVENTOR

BY
A. B. Reavis
ATTORNEY

Feb. 5, 1929.

H. T. HERR 1,701,364

DIESEL GENERATOR COMBINATION

Filed March 1, 1927    5 Sheets-Sheet 5

H.T. Herr
INVENTOR

WITNESSES:
E. Lutz

BY
a. B. Reavis
ATTORNEY

Patented Feb. 5, 1929.

1,701,364

UNITED STATES PATENT OFFICE.

HERBERT T. HERR, OF MERION, PENNSYLVANIA, ASSIGNOR TO WESTINGHOUSE ELECTRIC & MANUFACTURING COMPANY, A CORPORATION OF PENNSYLVANIA.

DIESEL-GENERATOR COMBINATION.

Application filed March 1, 1927. Serial No. 171,872.

My invention relates to power producing apparatus, more particularly to power producing apparatus including a prime mover and a rotary driven machine having a frame, and has for its object to provide, in connection with the driven machine, a prime mover mounted on and carried by the driven machine.

More specifically, the object of my invention is to provide an electric generator with a frame having means for supporting a driving engine, together with means for transmitting motion from the driving engine to the generator.

Apparatus embodying features of my invention is illustrated in the accompanying drawings, forming a part of this specification, wherein.

Figure 1:
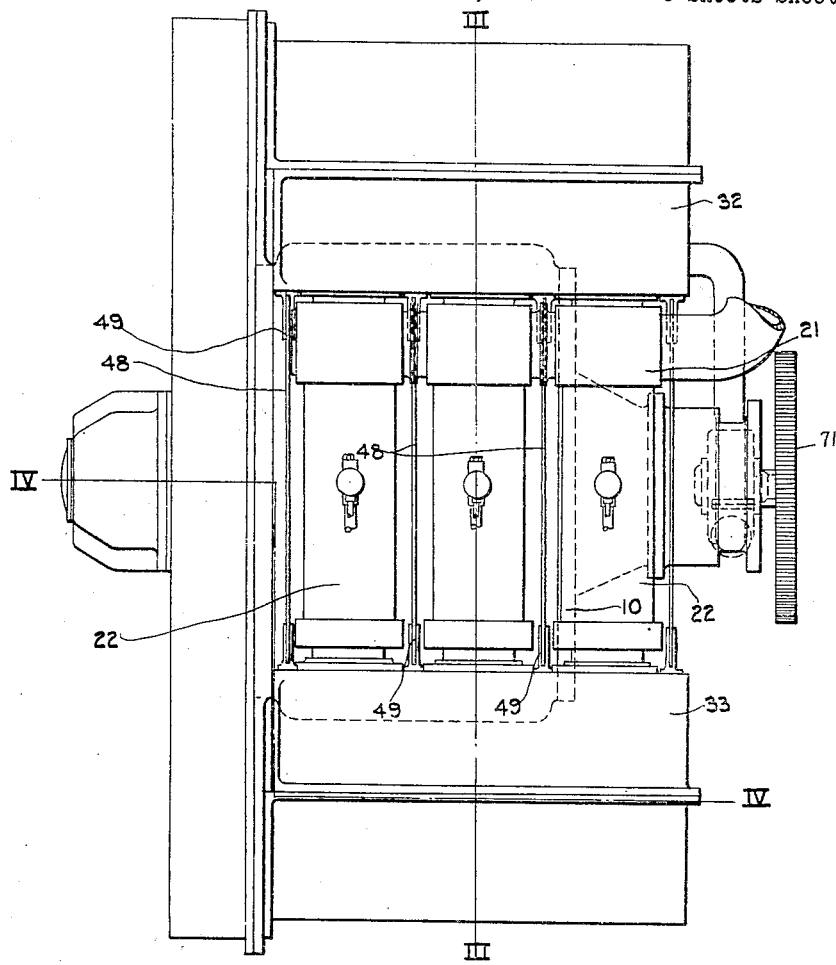
Fig. 1 is a plan view of an electric generator having a frame with engine supporting means, and having my improved engine mounted thereon.

In the design of power producing apparatus including an electric generator, especially of relatively large sizes, the space occupied by the generator and by the prime mover driving the generator has been considerable. Furthermore, the necessity of providing separate foundations for the prime mover and for the generator has entailed the use of considerable material and expense. In accordance with my invention, I am enabled to greatly reduce the space necessary to be occupied by power producing apparatus for a given unit of power and have provided a sturdy, rugged combined prime mover and generator having single supporting means for the two and which is simple of design and easy of manufacture.

Briefly, my invention comprises an electric generator having a frame which may be secured in any well known manner to a suitable foundation and which is provided with engine supporting means. On the engine supporting means I have mounted an improved internal combustion engine of the Diesel type which is very compact of design and which is capable of being utilized for transmitting power to the generator with the employment of the minimum of power transmitting means and the minimum of space occupied thereby.

Referring now to the drawings for a better understanding of my invention, I show, in Figs. 1 to 4 inclusive, an electric generator 10 having supporting feet 11 which may be secured in any suitable manner to a foundation 12. The generator 10 is provided with a frame 13 which may be of cast iron or cast steel construction, and which carries the usual pole pieces 14. Within the frame of the generator 13 is a rotary member, or armature, 16 having a shaft 17 supported by suitable bearings 18 and 19.

The generator frame 13 is adapted, in a manner to be described more particularly hereinafter, to support a prime mover comprising a Diesel engine, indicated generally at 21, and which includes a plurality of cylinders 22 disposed in parallel relation across the top of the generator frame. The cylinders 22 each have disposed therein a pair of opposed pistons 23 which are connected to suitable cranks such as 24, at opposite ends of the cylinder 22. The cranks 24 are formed on crank shafts 27 and 28, carried in bearings 29 and 31, respectively. The crank shafts 27 and 28 and bearings 29 and 31 are surrounded by crank cases 32 and 33, the inner halves of said crank cases being preferably formed as integral parts of the generator frame 13. The crank cases 32 and 33 each include bearing supporting means 34 and 35, respectively, and are joined to the main portion of the frame 13 by means of tangential webs 37 and 38 extending longitudinally of the cylinders 22.

The engine 21 as illustrated, is of the twocycle type and the cylinders 22 each have a centrally disposed fuel inlet 39, an exhaust outlet 41 and an air scavenging inlet 42, the outlet 41 and the inlet 42 being arranged at the opposite ends of the cylinders, respectively, from the fuel inlet 39. Thus when a charge of fuel is being burned in the cylinders 22, it will be seen that the working forces of the engine tend to spread the crank shafts 27 and 28 apart and the webs 37 and 38, extending as they do longitudinally of the cylinders, serve to effectively oppose the working forces of the cylinders.

Figure 2:
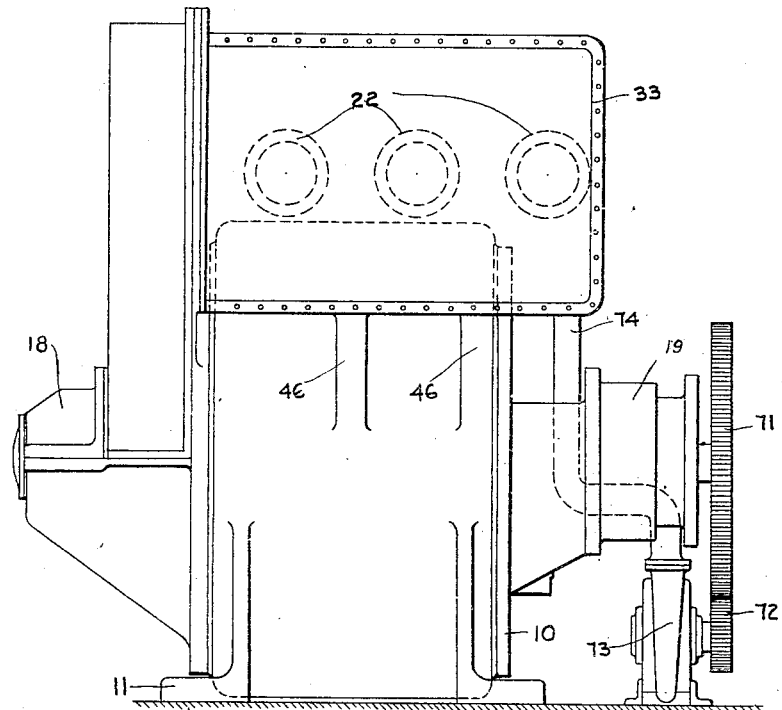
Fig. 2 is a side elevation of the apparatus illustrated in Fig. 1.
Figure 3:
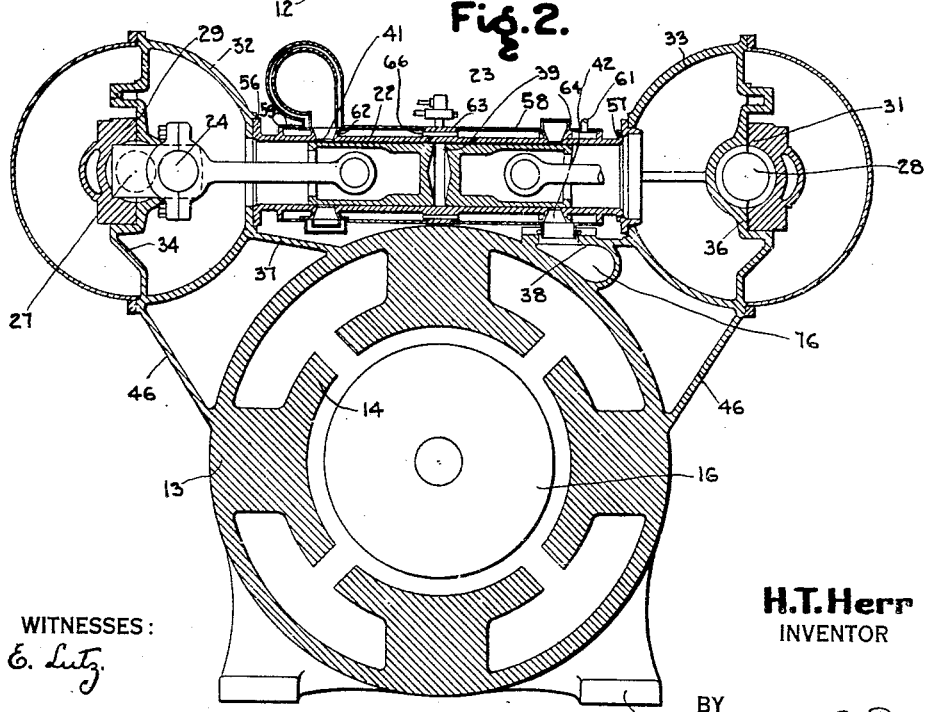
Fig. 3 is a sectional view taken along the line III—III of Fig. 1.
Figure 4:
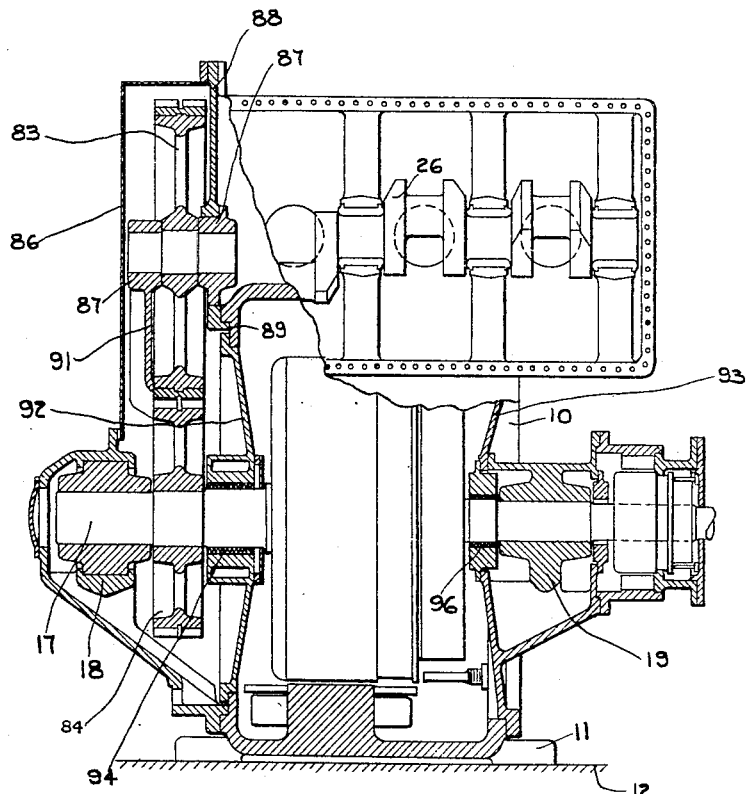
Fig. 4 is a sectional view taken along the line IV—IV of Fig. 1.

The crank cases 32 and 33 are each further supported from the generator frame by means of a suitable number of web members 46—46, also preferably formed integrally with the frame 13 and extending upwardly from the sides of the frame as may best be seen in Figs. 2 and 3.

The crank case supporting means as just described may be designed to withstand all of the working forces of the engine cylinders. Preferably however, I provide further tension members such as 48—48, as seen in Fig. 1, and which may be in the form of plates extending between the crank cases 32 and 33 and secured at their ends to the crank cases as by means of clevises 49—49. The means thus provided for withstanding the working forces of the engine cylinders obviate any necessity for the cylinders being subjected to tension stresses. Accordingly I arrange the cylinders so that they may freely expand and contract during temperature changes. To this end, the cylinders 22 may each be secured at one end thereof to a crank case as shown at 56 in Fig. 3 and be provided with a sliding fit as shown at 57.

The cylinder 22, being subjected only to the stresses due to pressure therewithin may be of relative thin-wall section so as to be easily cooled. I show the cylinder as being provided with a water jacket 58 having water inlet means 59 and water outlet means 61. The walls of the cylinder are thickened at 62, 63 and 64, at the exhaust outlet, the fuel inlet, and the scavenging inlet respectively, and these thickened portions may be provided with suitable passages such as is shown at 66 for the circulation of cooling water therethrough, all as is described in a copending application of Alexander T. Kasley, Serial No. 158,969, filed January 4, 1927, and assigned to the Westinghouse Electric & Manufacturing Company.

In order to provide compact means for supplying scavenging air to the cylinders 22, I provide a gear 71 carried by the generator shaft 17 and meshing with a gear 72 carried by a blower 73. The blower 73 forces air through a conduit 74 into a pocket 76 formed integrally with the generator frame 13, said pocket 76 being in communication at all times with the scavenging inlets 42 so that at proper periods of the stroke of the engine pistons, scavenging air is permitted to enter through said inlets to drive the products of combustion from the cylinder and to provide a fresh supply of air for the next power stroke thereof, all as is well understood in the art to which my invention relates.

Figure 5:
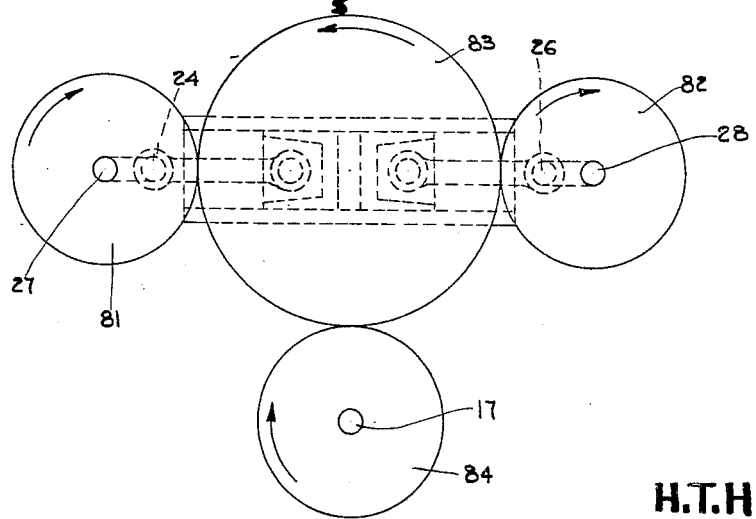
Fig. 5 is a diagrammatic view showing the arrangement of gearing for transmitting power from the engine to the generator.

Fig. 5 shows, diagrammatically, the arrangement for transmitting power from the engine 21 to the generator 10. The crank shafts 27 and 28 carry gears 81 and 82, respectively. The gears 81 and 82 both mesh with an idler gear 83, and the idler gear 83 meshes with a driving gear 84 carried by the generator shaft 17. The gears 81 to 84 inclusive are enclosed in a gear case 86, the gear case being supported on the generator frame in any suitable maner. The idler gear 83 is supported in suitable bearings 87 carried by a web member 88 joined to the generator frame at 89 and by a second supporting member 91 also carried by the generator frame. The ends of the generator frame 13 are closed by a pair of diaphragm members 92 and 93. In order to prevent leakage of oil from the gear case 86 to the interior of the generator and from the bearings 19 to the interior of the generator, suitable labyrinth packings 94 and 96 may be provided in the diaphragm members 92 and 93 where they surround the shaft 17.

Figure 7:
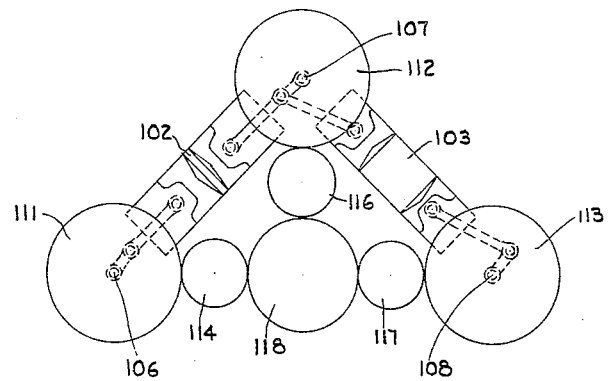
Fig. 7 is a diagrammatic view showing the arranged of gears for apparatus constructed in accordance with Fig. 6.
Figure 6:
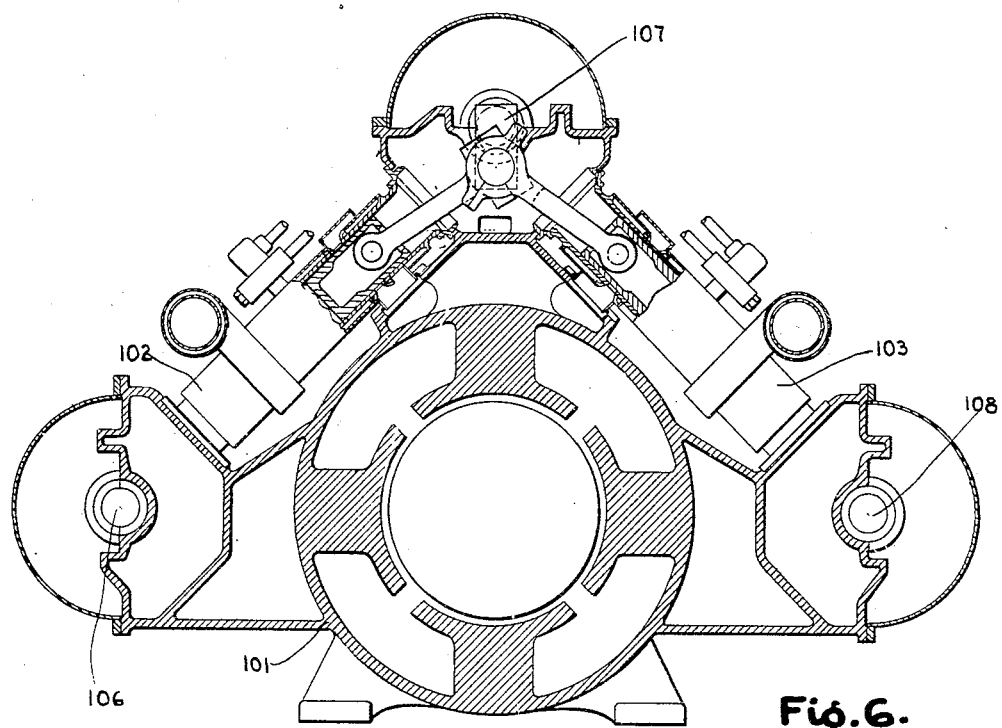
Fig. 6 is a view similar to Fig. 3, and showing a modified form of my invention.

The apparatus so far described consists of a single bank of cylinders disposed transversely of the generator frame across the top thereof. It will be apparent however, that it is quite possible to further increase the power capable of being developed by such a unit by increasing the number of cylinders and disposing the banks of cylinders in angular relation to each other around the generator frame. For example, in Figs. 6 and 7, I show an arrangement comprising a generator frame 101 having a pair of banks of cylinders, cylinders 102 and 103 being units thereof, each of these cylinders being connected to the generator frame in a similar manner as described in connection with Figs. 1 to 4 inclusive. The cylinders 102 and 103 drive crank shafts 106, 107 and 108. The relation of the crank shafts 106, 107 and 108 may best be seen by reference to Fig. 7 where they are shown as driving gears 111, 112 and 113, respectively. The driving gears 111, 112 and 113 mesh with idler gears 114, 116 and 117, respectively, and the idler gears all mesh with a driven gear 118, which may be carried by the generator shaft and thus serve to transmit power from the cylinders 102 and 103.

Figure 8:
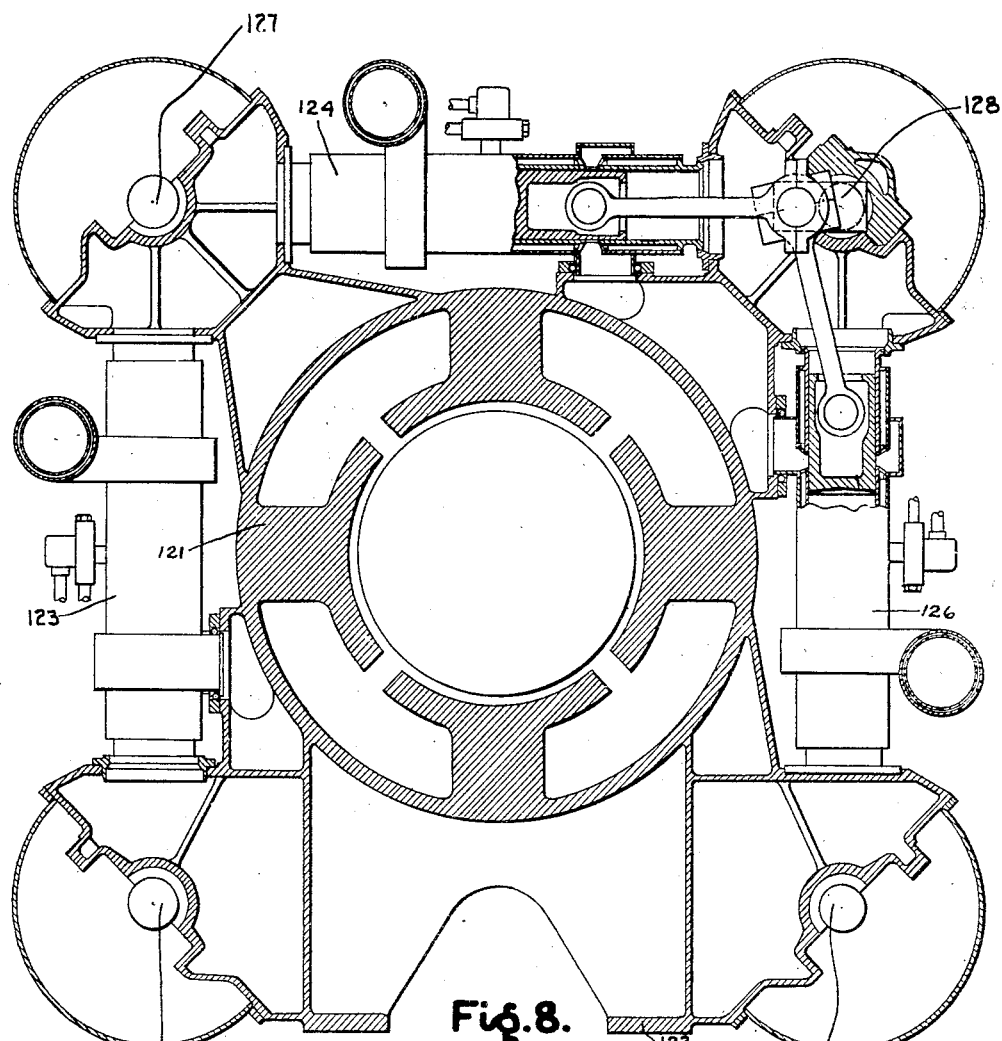
Fig. 8 is a view similar to Fig. 6 and showing a further modified form of my invention.

In Fig. 8, I show a further modified form of my invention wherein a generator frame 121 is provided with supporting feet 122 adapted to be secured to any suitable foundation and wherein power may be transmitted to the generator from three banks of cylinders 123, 124 and 126, the cylinders having pistons connected to crank shafts 127, 128, 129 and 131. The cylinder banks 123, 124 and 126, as may be seen from the drawings, are supported from the generator frame in a similar manner as described in detail in connection with Figs. 1 to 4 inclusive.

Figure 9:
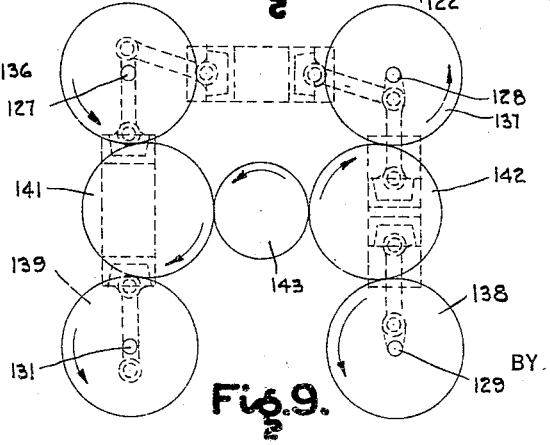
Fig. 9 is a diagrammatic view showing the arrangement of gears for apparatus made in accordance with Fig. 8; and, Fig. 10 is a perspective view of a still further modified form of my invention.

In Fig. 9, I show an arrangement of gearing suitable for transmitting power from apparatus such as is illustrated in Fig. 8. The crank shafts 127, 128, 129 and 131 have connected thereto driving gears 136, 137, 138 and 139, respectively. The driving gears 136 and 139 mesh with an idler gear 141 and the driving gears 137 and 138 mesh with an idler gear 142. The idler gears 141 and 142 mesh with the driven gear 143 which may be used to transmit power to the generator.

Figure 10:
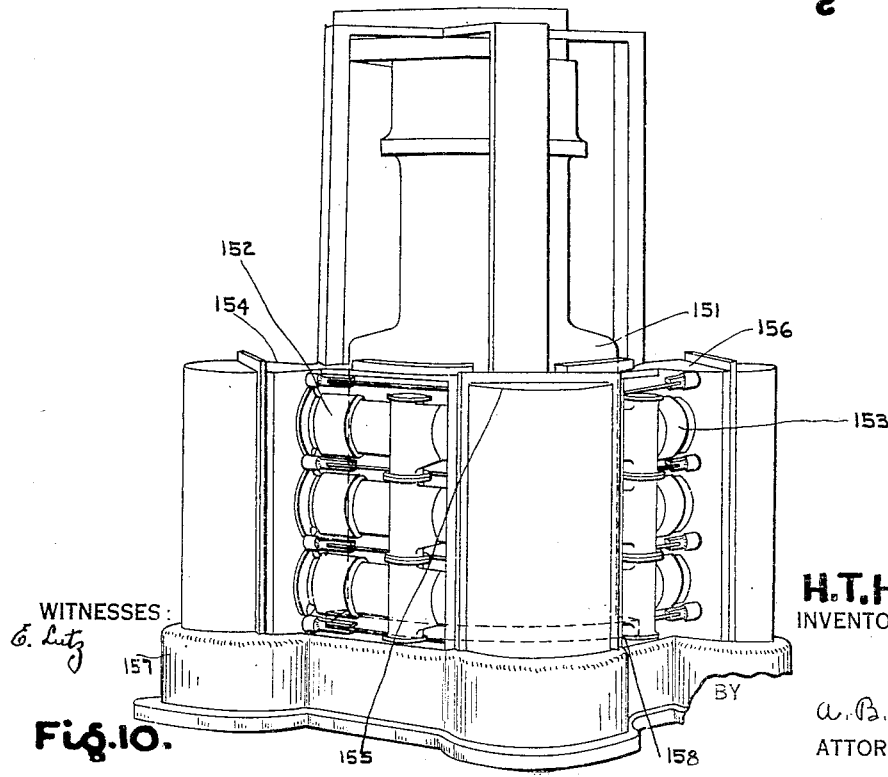

Referring now to Fig. 10, I show a still further modified form of my invention wherein the generator has its rotational axis disposed vertically. The frame of the generator is indicated at 151 and banks of cylinders may be provided around the entire frame in the form of a polyhedron, two of the sides thereof being comprised of the banks of cylinders 152 and 153. The interior construction of the generator frame may be similar to that already described in connection with the other views and need not be again repeated. The crank shafts for the cylinders in the form of apparatus illustrated in this figure of the drawing would occur at the vertices of the polyhedron, three being shown in the drawing at 154, 155 and 156. With the form of apparatus illustrated in Fig. 10, I prefer to provide a gear case of relatively heavy construction such as is shown at 157 and support the generator frame on the gear case such as by a flange 158, shown in dotted lines.

From the foregoing, it will be apparent that I have devised improved power producing apparatus wherein a driven machine is provided with supporting means for a driving machine and wherein the entire apparatus is very compact, easy of installation and rugged in character.

While I have shown my invention in several forms, it will be obvious to those skilled in the art that it is not so limited, but is susceptible of various other changes and modifications without departing from the spirit thereof, and I desire, therefore, that only such limitations shall be placed thereupon as are imposed by the prior art or as the specifically set forth in the appended claims.

What I claim is:—

1. In a power plant, an engine having a cylinder with a pair of opposed pistons mounted therein, a driven machine embodying a frame and a rotary member with the frame supporting the rotary member and also provided with means for supporting the machine, a pair of crank shafts for the engine, bearings for the crank shafts, and means for supporting the crank shafts and the cylinders on the frame of the driven machine.

2. The combination with a generator having a stator and a rotor supported thereby; of an engine of the opposed piston type including a plurality of cylinders supported by the stator, a plurality of crank shafts supported by the stator, and pistons in the cylinders and connected to the crank shafts; and means for transmitting motion from the crank shafts to the rotor.

3. The combination with a generator having a stator and a rotor supported thereby; of an engine of the opposed piston type including a cylinder supported by the stator, a plurality of crank shafts supported by the stator, pistons in the cylinder and connected to the crank shafts; and gearing means for transmitting power from the crank shafts to the rotor.

4. In a power plant, the combination of an engine cylinder, a pair of opposed pistons in the cylinder, a driven machine including a frame, a pair of crank shafts, bearings for the crank shafts, means for supporting the driven machine, power transmitting means disposed between the crank shafts and the driven machine, and means for supporting the power transmitting means by the frame of the driven machine.

5. The combination with a rotary driven machine having a rotor and a frame and an engine of the opposed piston type for driving the machine, of a pair of crank shafts for the engine, bearings for the crank shafts, means carried by the driven machine frame for supporting the crank shaft bearings, gearing means between the crank shafts and the rotor of the driven machine, bearings for the driven machine and for the gearing means and means rigidly secured to the frame of the driven machine for supporting said bearings and said gearing means.

6. The combination with an electric generator having a stator and a rotor supported thereby and an engine of the opposed piston type for driving the generator, of means for supporting the engine cylinders on the generator stator transversely of the latter, crank shafts for the engine, crank cases for supporting the crank shafts, and extending longitudinally of the generator stator and means for supporting the crank cases from the generator stator and effective for resisting the working stresses of the engine.

7. The combination with an electric generator having a frame and a rotor and an engine of the opposed piston type for driving the generator, of means for supporting the engine cylinders on the generator frame transversely thereof, crank shafts for the engine, crank cases for supporting the crank shafts and extending longitudinally of the generator frame, means for supporting the crank cases from the generator frame and effective for resisting the working stresses of the engine, a driving gear carried by each of the crank shafts, an idler gear meshing with the driving gears, a driven gear carried by the generator rotor and meshing with the idler gear, means for supporting the driving gears and the idler gear from the generator frame, and means for sealing the interior of the generator against leakage of oil from all of said gears.

8. The combination with an electric generator having a frame and a rotor and a Diesel engine having a plurality of cylinders of the opposed piston type for driving the generator, of means for supporting the engine cylinders on the generator frame transversely thereof, crank shafts for the engine, crank cases for supporting the crank shafts and extending longitudinally of the generator frame, and means for supporting the crank cases from the generator frame and effective for resisting the working stresses of the engine, a driving gear carried by one end of each of the crank shafts, a driven gear carried by the generator rotor, idler gear means meshing with the driving and the driven gears, and means for supporting the idler gear means from the generator frame and including packing means for preventing the leakage of oil into the generator.

9. The combination with an electric generator having a frame and a Diesel engine of the opposed piston type for driving the generator and comprising a plurality of cylinders disposed in side by side relation, of a pair of crank shafts for the engine, a crank case for each of the crank shafts, means for supporting the crank cases from the generator frame longitudinally thereof, means for fixedly supporting one end of each of the cylinders to one of the crank cases, and means providing a sliding fit between the other end of each of the cylinders and the other crank case.

10. The combination with a generator having a stator and a rotor supported thereby, of a multiple cylinder engine supported by the stator and including cylinders extending substantially tangentially with respect to said stator and whose axes intersect, a crank shaft for the engine disposed at the intersection of the axes of the cylinders and extending longitudinally of the stator, and means for transmitting motion from the crank shaft to the rotor.

11. The combination with a generator having a stator and a rotor supported thereby, of an engine including cylinders arranged in V formation and supported by the stator, a crank shaft supported by the stator and disposed in the vertex of the V, and means for transmitting motion from the crank shaft to the rotor.

12. The combination with an electric generator having a stator and a rotor supported thereby and a Diesel engine of the opposed piston type for driving the generator, of a plurality of cylinders for the engine disposed in side by side relation tangentially of the stator, a pair of crank shafts for the engine, a crank case for each of the crank shafts, supporting ribs formed on the generator stator and extending outwardly thereof to support the crank cases relatively remote from the generator stator and effective for offsetting the working stresses of the engine.

13. The combination with an electric generator having a stator and a rotor supported thereby and a Diesel engine of the opposed piston type for driving the generator, of a plurality of cylinders for the engine disposed in side by side relation tangentially of the stator, a pair of crank shafts for the engine, cranks on the crank shafts, a crank case for each of the crank shafts, and a plurality of supporting ribs formed on the generator stator, one for each of the cranks and extending outwardly of the stator in a direction transversely of the crank cases for supporting said crank cases in a position relatively remote from the generator stator and for opposing the working stresses of the engine.

14. The combination with an electric generator having a stator and a rotor supported thereby and a Diesel engine of the opposed piston type for driving the generator, of a group of cylinders for the engine disposed in parallel relation along the generator stator, additional groups of cylinders disposed along the generator stator each other group being in V formation with respect to the first mentioned group, a crank shaft serving adjacent groups of cylinders, and disposed in vertices of the V's, another crank shaft serving the other end of each of the group of cylinders, crank cases for the crank shafts, and ribs formed on the generator stator extending transversely to the crank cases and secured thereto for supporting the crank cases and opposing the working stresses of the engine.

15. In a power plant, the combination of a driven machine having rotor and stator elements; engine means including a plurality of cylinders, opposed pistons in the cylinders, crank shafts connected to the pistons, and bearings for the crank shafts; means formed integrally with the stator elements for supporting the cylinders and the crank shaft bearings; and tension means for resisting engine working forces imposed on said bearings.

16. In a power plant, the combination of a driven machine having an element rotatable about a horizontal axis and a horizontally extending stator element disposed about the rotatable element, an engine having a cylinder with a pair of opposed pistons mounted therein, crank shaft means for the engine, and means operatively connecting the crank shaft means to the rotary element of the driven machine, said cylinder and crank shaft means being supported upon and carried by said horizontally extending stator element.

17. In a power plant, the combination of a generator having a horizontally disposed rotor element and a stator element therefor, an engine having a cylinder with a pair of opposed pistons mounted therein, crank shaft means for the engine, and means operatively connecting the crank shaft means to the rotary element of the driven machine, said cylinder and crank shaft means being supported upon and carried by the stator element.

18. In a power plant, the combination of a driven machine having an element rotatable about a horizontal axis and a stator element disposed about the rotatable element, an engine having a cylinder with a pair of opposed pistons mounted therein, crank shaft means for the engine, and means operatively connecting the crank shaft means to the rotary element of the driven machine, said cylinder and crank shaft means being superimposed horizontally upon the stator element and carried thereby.

In testimony whereof, I have hereunto subscribed my name this 16th day of February, 1927.

HERBERT T. HERR.